Feb. 13, 1951 S. SCHNELL 2,541,551
WHEEL CYLINDER SUPPORT
Filed Oct. 31, 1946

INVENTOR:
STEVE SCHNELL

BY
ATTORNEY.

Patented Feb. 13, 1951

2,541,551

UNITED STATES PATENT OFFICE 2,541,551

WHEEL CYLINDER SUPPORT

Steve Schnell, Kirkwood, Mo., assignor to Wagner Electric Corporation, St. Louis, Mo., a corporation of Delaware Application October 31, 1946, Serial No. 706,847

3 Claims. (Cl. 188—152)

This invention relates to thrust receiving means and brake cylinder supporting means for a brake assembly.

The object of this invention is to provide means by which each brake cylinder is supported for movement relative to its supporting means and wherein the brake cylinder is not subjected to the braking thrust.

Another object of this invention is to provide a brake cylinder support in which the cylinder is supported on two sides thereof.

In the drawings

Figure 1:
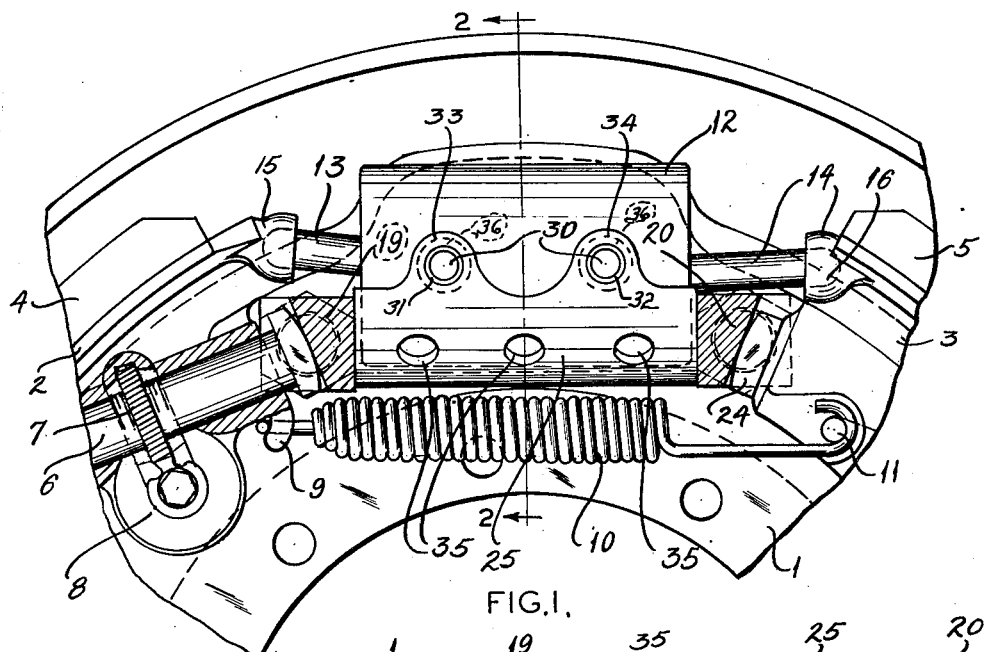
Figure 1 is an elevational view of a portion of a brake assembly incorporating the invention.
Figure 2:
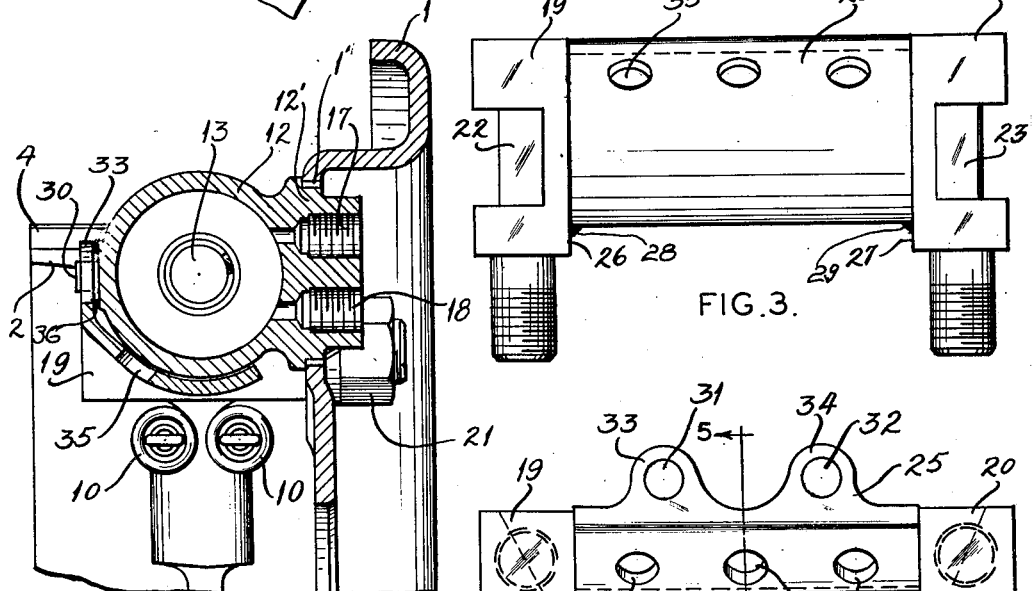
Figure 2 is a sectional view taken substantially along the line 2—2 of Figure 1.
Figure 3:
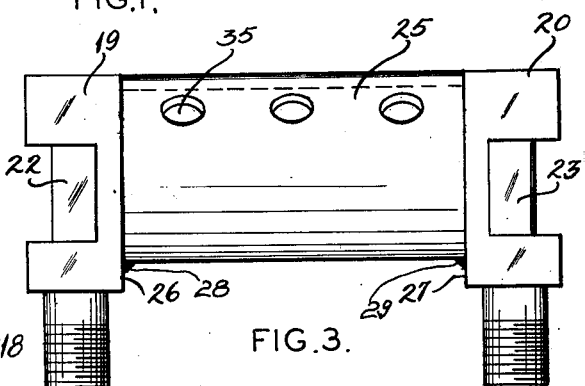
Figure 3 is an elevational view of the thrust receiving members and the brake cylinder support.
Figure 4:
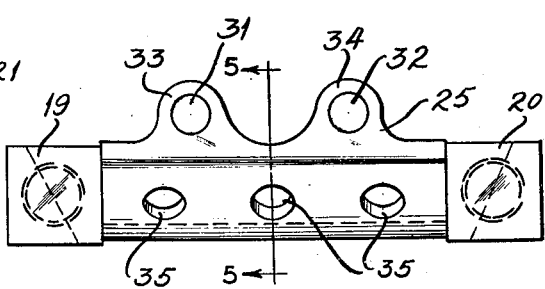
Figure 4 is a front elevational view of the mechanism shown in Figure 3.
Figure 5:
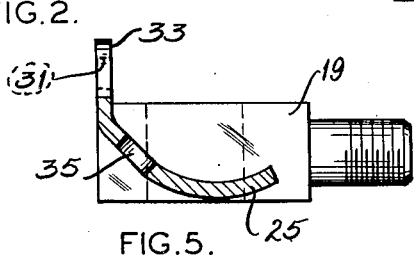
Figure 5 is a sectional view taken substantially along the line 5—5 of Figure 4.

The brake assembly comprises a conventional backing plate 1 on which a pair of shoes 2 and 3 is pivotally mounted to which friction elements 4 and 5, respectively, are secured by means well known in the art.

One brake thrust transmitting member in shoe 2 consists of a bolt 6 which also serves as a brake shoe adjusting member by means of gears 7 and 8, more complete details of which are illustrated and described in copending application Serial No. 600,920, filed June 22, 1945, Patent No. 2,508,194, May 16, 1950. One end of shoe 3 is so formed as to appropriately transmit brake thrust to the abutment secured to the backing plate as will be subsequently set forth. The undisclosed end of shoe 2 is the same as that shown for shoe 3 and vice versa. A hook 9 is formed on shoe 2 to which one end of retracting springs 10 is secured and the opposite ends of the springs are connected to a pin 11 arranged in shoe 3.

The brake cylinder 12 is provided with a pair of pistons (not shown) and with piston rods 13 and 14 which cooperate with suitable sockets 15 and 16 formed in the ends of shoes 2 and 3, respectively, to enable the aforesaid pistons to bring the shoes into engagement with the brake drum. Brake cylinder 12 is provided with suitable ports 17 and 18 formed in a boss 12' on said cylinder extending through an aperture 1' in backing plate 1 which is larger than said boss. A conduit originating in a master cylinder may be connected to port 18 in order to supply pressure fluid for the operation of the brake cylinder and the other port 17 may have a suitable valve arranged therein for bleeding entrapped air and brake fluid from the wheel cylinder.

Each of the brake shoe thrust receiving abutments 19 and 20 is rigidly secured to backing plate 1 by means of nut 21 and is slotted to provide surfaces 22 and 23. Surfaces 22 and 23 present suitable angles to accomplish self-centering of the brake shoes 2 and 3, and are appropriately machined to receive the thrust transmitted from the braking effort by the head of bolt 6 of shoe 2 and shaped end 24 of brake shoe 3, respectively. The confining shoulders of surfaces 22 and 23 assist in maintaining brake shoes 2 and 3 in correct lateral position with respect to backing plate 1.

Disposed between abutment members 19 and 20 and in engagement with the faces 26 and 27 thereof is a bracket 25. Bracket 25 may be suitably secured to abutments 19 and 20 by welds 28 and 29 to prevent relative motion between the bracket and said members. Brake cylinder 12 is also supported on one side thereof by means of projections 30 formed integrally with the brake cylinder and which extends into apertures 31 and 32 formed in ears 33 and 34 on bracket 25 which are larger in diameter than projections 30 to thereby enable the brake cylinder to move relatively to the bracket 25 and to backing plate 1 with no brake thrust transmitted to brake cylinder 12. A spring 36 is disposed between ears 33 and 34 and brake cylinder 12 for the purpose of urging the cylinder toward backing plate 1. Springs 36 are preferably of dished washer construction which is given spring properties as is well known in the art. The opposite side of the brake cylinder is supported in the backing plate as previously described. Bracket 25 may be provided with a plurality of apertures 35 for the purpose of cooling the brake cylinders.

Having fully described my invention, that which I claim as novel and desire to protect by Letters Patent of the United States is:

1. A brake mechanism comprising a backing plate; means secured to said backing plate including brake thrust receiving abutments and a bracket supported thereby; and a brake cylinder supported by said bracket and said backing plate for movement relative to said backing plate.

2. A brake mechanism comprising a backing plate; abutments mounted on said backing plate; a brake cylinder provided with supporting means including a bracket; and means supported by said abutments and having means therein cooperating with said supporting means on said cylinder to support said brake cylinder for movement relative to said backing plate.

3. A brake mechanism comprising a brake cylinder; a backing plate having an aperture therein; abutment means supported on said backing plate; means disposed between said abutments for supporting said brake cylinder for movement relative to said backing plate and provided with apertured ears; means on said brake cylinder received in said aperture in said backing plate and movable relative thereto and other means on said cylinder cooperating with said apertured ears to support same for movement relative to said backing plate.

STEVE SCHNELL.

REFERENCES CITED

The following references are of record in the file of this patent:

UNITED STATES PATENTS

| Number | Name | Date |
| --- | --- | --- |
| 1,786,856 | Madden | Dec. 30, 1930 |
| 1,898,108 | White | Feb. 21, 1933 |
| 2,152,066 | La Brie | Mar. 28, 1939 |
| 2,294,293 | Goepfrich | Aug. 25, 1942 |
| 2,319,583 | Chambers | May 18, 1943 |